April 23, 1946.  W. E. MOFFITT  2,398,839
TRANSMISSION
Filed Dec. 28, 1940  2 Sheets-Sheet 1

Inventor:
William E. Moffitt
By Edward C. Fitzhaugh
Atty.

April 23, 1946.   W. E. MOFFITT   2,398,839
TRANSMISSION
Filed Dec. 28, 1940   2 Sheets-Sheet 2

Inventor:
William E. Moffitt
By:
Edward C. Fitzbaugh
Atty.

Patented Apr. 23, 1946

2,398,839

UNITED STATES PATENT OFFICE 2,398,839

TRANSMISSION

William E. Moffitt, Muncie, Ind., assignor to Borg-Warner Corporation, Chicago, Ill., a corporation of Illinois Application December 28, 1940, Serial No. 372,030

13 Claims. (Cl. 74—290)

This invention relates to speed ratio changing devices and particularly to a speed reducing mechanism which is to be used with an aircraft engine.

This application is a continuation-in-part of my application Serial No. 359,987 filed October 7, 1940. In this prior application is described and claimed a planetary transmission which is to be used between an aircraft engine and propeller to reduce the speed of the propeller with respect to the drive shaft of the engine and thereby enable the engine to rotate at a higher speed, particularly at the take-off. The increased torque resulting from the higher speed of the engine improves maneuverability and enables the plane to climb at a steeper angle.

The principal object of this invention is to improve the foregoing airplane transmission by omitting and simplifying certain of the parts thereof without omitting the functions performed thereby.

Another important object of this invention is to incorporate in the reduced drive a shock absorbing function which removes the shock load from the gear teeth and permits the use of lighter gears without sacrificing safety.

These and other objects and features of this invention will become apparent from the following description when taken together with the accompanying drawings in which.

Figure 1:
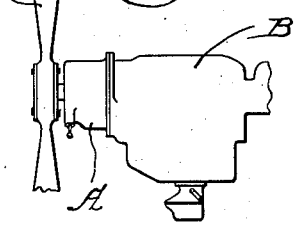
Fig. 1 is a view showing the transmission assembled with its cooperating engine and propeller.
Figure 3:
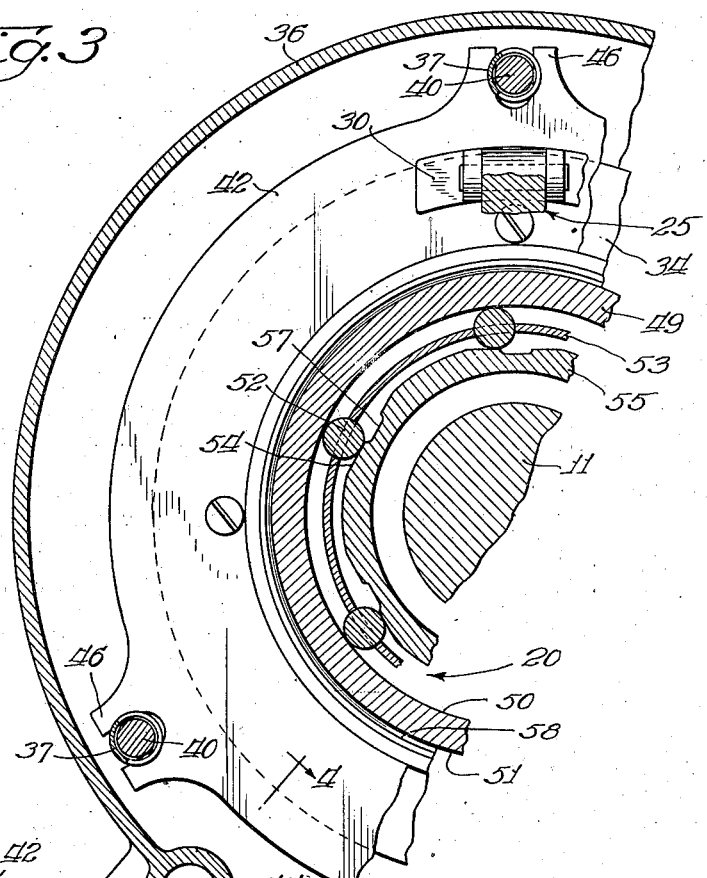
Fig. 3 is a fragmentary front elevation in section of the transmission taken along lines 3—3 of Fig. 2.
Figure 4:
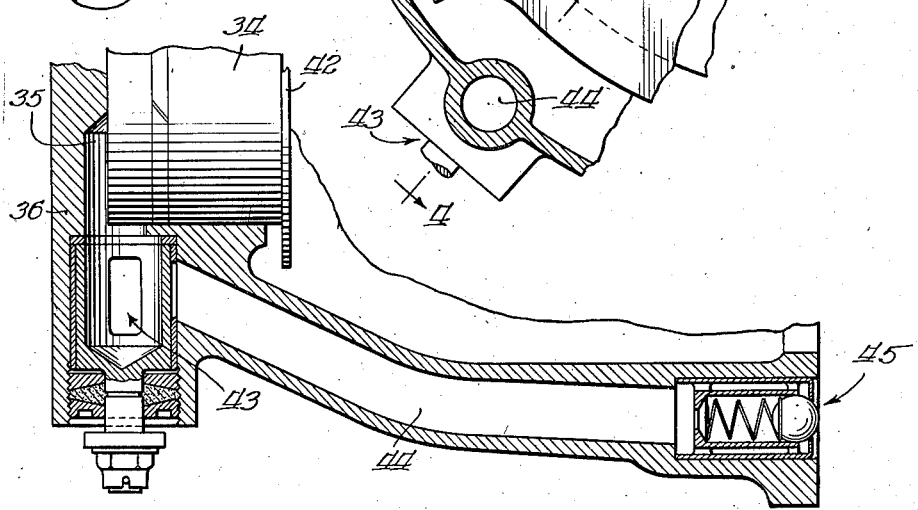
Fig. 4 is a fragmentary side elevation of the casing showing an improved means for conducting fluid under pressure to the transmission.

The transmission, when installed in a plane, is interposed between the engine and propeller so that the speed of the propeller may be changed relative to the speed of the engine. This is shown in Fig. 1 wherein the transmission A is shown secured to the output end of engine B and driving propeller C. Because of minimum weight requirements, aircraft engines usually dispense with flywheels as such and are designed to have a low rotational inertia. Such flywheel action as is necessary to keep the engine running is provided by the propeller. It is apparent then, that the transmission A being located between the engine B and propeller C is subject to the full force of the impulses or shocks produced by the engine, undiminished by any flywheel. In this respect transmission A differs from automobile transmissions since the latter transmit engine torque only after it has been smoothed out by a flywheel. The requirements which the transmission of this invention has to meet are therefore different from those of an ordinary transmission and the manner in which these requirements are met will be described hereinafter.

Referring now to the drawings for a detailed description of the invention, the transmission may be described briefly as comprising a drive shaft 10 normally connected to the engine B and comprising the crank shaft thereof, a driven shaft 11, to one end of which is splined a flange 12 which constitutes a support for propeller C. Intermediate shafts 10 and 11 are a planetary gear set 13 which comprises a ring gear 14 bolted to drive shaft 10, a sun gear 15 mounted on driven shaft 11 and rotatable with respect thereto, and planet pinions 16 meshing with ring gear 14 and sun gear 15. A carrier 17 is mounted on a flange 18 rigid with driven shaft 11 and supports planet pinions 16.

A clutch 19 of the positive type is used to connect ring gear 14 with carrier 17 for direct drive. An automatic one-way brake 20 of the roller-and-cam type is used to arrest the rotation of sun gear 15 when clutch 19 is released to secure a reduced drive between ring gear 14 and carrier 17.

Positive clutch 19 is comprised of a pair of oppositely disposed radially movable pawls 21 which are adapted to move into axially aligned windows or slots 22 in a drum 23 which is an extension of ring gear 14. Pawls 19 are mounted in supports 24 which are secured to carrier 17 and rotatable therewith. To simplify the construction of the planetary gear set and pawl support the number of planet gears has been reduced to two which are equally spaced with respect to pawls 19.

Each pawl 19 is operated by means of a bell crank 25 pivoted on supports 24. Said bell crank 25 is comprised of an arm 26 having a rounded end 27 cooperating with a slot 28 in pawl 21. A second arm 29 extends upwardly and outwardly with respect to arm 26 and is provided with a pivoted shoe 30 at its free end. As an important feature of this invention, said arm 29 and shoe 30 are made heavier than arm 26 to balance the weight of pawl 21 and reduce materially the effect of centrifugal force upon the pawl. This balancing effect makes the disengagement easier and permits a lighter construction to be used in the disengaging mechanism.

Pawl 21 is normally biased radially outward toward engaged position by means of a spring 31 which is compressed between the bottom of the pawl and an ear 32 on plate 33 secured to carrier 17. Pawl 21 is disengaged by the action of a piston 34 which is adapted to move to the right (Fig. 1) and engage shoe 30. Said piston 34 is mounted in an annular cylinder 35 in housing 36. Piston 34 is normally maintained in its released position by means of a plurality of springs 37 which are compressed between a washer 38 retained by a transverse pin 39 on a pin 40 and a second washer 41 which abuts a plate 42 fastened to piston 34. Pin 40 in turn is fixed in housing 36 by means of another pin 40'. Movement to engaged position is effected by rotating a valve 43 to admit oil under pressure to cylinder 35, the oil being obtained from a conduit 44 cored in housing 36. Conduit 44 is connected through a ball check valve 45 to the oil line of engine B. The details of the valve and conduits are described in full in my previous application Serial No. 359,987 and hence will not be described here.

Plate 42 is provided with slotted ears 46 through which pass pins 40 and by which plate 42 and piston 34 are held against rotation with respect to casing 36.

Sun gear 15 is integral with a sleeve 47 which is belled at 48 to provide an annular flange 49. The inner surface 50 of flange 49 is made cylindrical and the outer surface 51 is made conical. Cylindrical surface 50 cooperates with a plurality of rollers 52 which are retained by means of a ring 53 in spaced relation with respect to a plurality of cam surfaces 54 on a cam ring 55. Said cam ring 55 is anchored at 56 to casing 36 so as to be non-rotatable with respect thereto. Cam surfaces 54 are so arranged that rollers 52 ride up the cam surfaces when sun gear 15 tends to rotate backwardly, and ride down the cam surfaces 54 to recesses 57 when sun gear 15 tends to rotate forwardly. In this manner, sun gear 15 is held against backward rotation by rollers 52 which thus constitute an automatic one-way brake.

When clutch 19 is released by the right-hand movement of piston 34 (Fig. 2), the reaction of the load upon sun gear 15 tends to rotate the gear backwardly, but as stated above, this backward rotation is prevented by means of rollers 52. If the ship should dive when the transmission is in reduced gear, the propeller might tend to windmill at a higher speed than provided by gearing 13 and thereby pick sun gear 15 off rollers 52. When this happens the engine is temporarily without a flywheel and hence may cease operating in which case if the pilot wishes again to apply power to his propeller to pull out of the dive, he would be unable to do so.

To prevent the windmilling of the propeller, piston 34 is provided with a conical friction surface 58 which is adapted to cooperate with conical surface 51 on flange 49 to hold sun gear 15 against rotation in the forward direction when clutch 19 is released. Said friction surface 58 may be grooved after the practice followed in synchronizer rings for automobile transmissions to improve the holding ability of the surface.

It is customary design practice to make all of the parts associated with the roller-and-cam device such as one-way brake 20 as rigid as possible to avoid the distortion which may result when the rollers ride up on their cams. It will be readily apparent that due to the relatively flat angle of the cams, the radial forces are quite high and that the cooperating members may be distorted if they are not made sufficiently rigid. This distortion manifests itself as a slight relative rotational movement between the driving and fixed elements. Where the power to the driving element is perfectly steady there is but a single such relative rotational movement at the time the power is applied, but where the power is in the form of impulses there will be a rotational movement for each impulse, with the natural resilience of the elements supplying the returning or restoring force.

Since weight is a prime factor in the design of airplane engines and propellers, and since such engines usually depend upon the propeller for the requisite flywheel action to keep them rotating smoothly, it has been found that the shock loads on drive shaft 10 are very severe, particularly where a small number of cylinders is used, as, for example, in light-plane engines. Where continuous geared drives for propellers are used it has been found necessary to make the gears considerably heavier than is required for the normal torque to be transmitted in order to provide sufficient strength to take care of these shock loads. I have discovered, however, that by deliberately making the one-way brake element lighter than usual and making no attempt to supply absolute rigidity, the one-way brake element can be made to function as a shock absorber and thereby make it possible to use normal size gears in the transmission. It will be noted that the belled portion 48 of sun gear sleeve 47, and cam ring 55, are made relatively thin and further, that a smaller number of rollers 52 is used than is customary. The smaller number of rollers concentrates the pressure over smaller areas and thus increases the unit pressure on the cooperating members, thereby increasing the likelihood of distortion occurring in the brake. Thus even though piston 34 prevents substantial radial expansion of flange 49 it does not prevent an inward flexing of cam ring 55 nor does it prevent torsional strains in sleeve 47 and belled portion 48.

Figure 2:
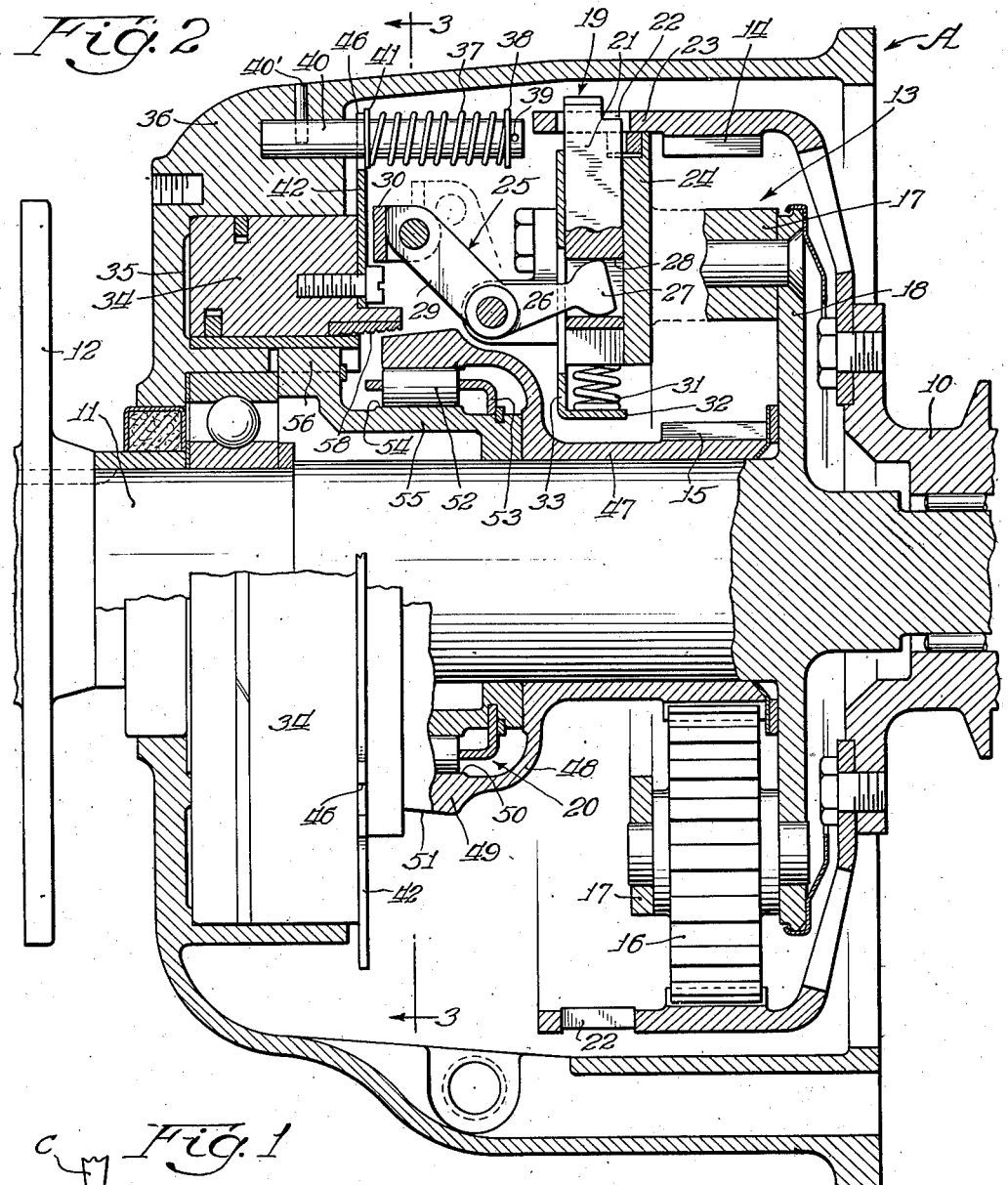
Fig. 2 is a side elevation in section through the improved transmission.

The operation of the device is as follows:

Under normal conditions, clutch 19 is engaged so as to connect ring gear 14 to carrier 17, which, in effect, connects shaft 10 directly with driven shaft 11. The propeller then rotates at engine speed. When it is desired to reduce the speed of the propeller with respect to drive shaft 10, valve 43 is operated to admit oil under pressure into cylinder 35 which then causes piston 34 to move to the right (Fig. 2). This movement of piston 34 causes plate 42 to compress springs 37 and also to strike pivoted shoes 30. Said shoes 30 may be slightly inclined with respect to plate 42 at this point due to their unbalanced weight but continued movement of cylinder 34 will eventually cause shoes 30 to lie flat against plate 42 and slide with respect thereto, since plate 42 is fixed and shoe 30 is mounted on rotating carrier 17. Still further movement to the right causes bell crank 25 to rotate clockwise to the position shown dotted in Fig. 2. When in the dotted position, arm 26 is lowered and through its connection with slot 28 in pawl 21, said pawl 21 will be moved radially inward against the action of spring 31 until pawl 21 is completely disengaged from slot 22 and clutch 19 thereby released. Upon the release of clutch 19 the reaction of the drive in ring gear 14 will be transferred to sun gear 15 and will tend to rotate said sun gear reversely. This reverse rotation, however, will be prevented by means of the roller-and-cam one-way brake 20 and driven shaft 11 therefore will be driven at a reduced speed with respect to drive shaft 10. This condition will obtain as long as pressure is maintained in cylinder 35 behind pistons 34. During this condition conical friction surfaces 51 and 58 will be in contact and sun gear 15 will be held against rotation in a forward direction to prevent the windmilling of the propeller. Vibrations transmitter to sun gear 15 will be absorbed by the spring action of one-way brake 20.

To restore the transmission to direct drive condition, fluid pressure is relieved by the proper operation of valve 43 whereupon springs 37 will move piston 34 back to the left (Fig. 2) and springs 31 will move pawls 21 radially outward thereby rotating bell crank 25 in a counterclockwise direction. When pawls 21 are aligned with their respective slots 22 they will enter these slots and effect a direct drive between drive shaft 10 and driven shaft 11. The balance provided by the extra weight in arm 29 and shoe 30 decreases materially the force with which pawls 21 strike the edges of slots 22 while ratcheting over them and thereby increases the life of the direct clutch 19 as a whole.

One-way brake 20 also performs another important function. When the engine is to be started, the transmission will be in direct drive since this is the most favorable ratio for starting purposes and also because no oil pressure is available for reduced drive when the engine is not running. If the engine should back-fire or tend to rotate backwardly during cranking, one-way brake 20 will prevent such backward rotation and thus protect the starting mechanism or the person spinning the propeller.

Friction surfaces 51 and 58 also perform an additional important function. One-way brake 20 is strained in one direction by the force of the impulses of the engine and is restored to its original condition by the resilience of its component parts. This restoring force, or recoil, is rather severe, and would tend to create negative vibrations. Because of the snubbing action of friction surfaces 51 and 58, the recoil is substantially reduced and a smoother operation of the engine results. This snubbing action is also effective in the opposite direction under severe impulse conditions wherein all of the resilience in brake 20 has been absorbed without fully checking the force of the impulse.

It is understood that the foregoing description is merely illustrative of a preferred embodiment of the invention and that the scope of the invention therefore is not to be limited thereto but is to be determined by the appended claims.

I claim:

1. A transmission for an impulse engine having a low rotational inertia, said transmission comprising a speed changing mechanism and an automatic one-way brake associated with the mechanism, said mechanism being adapted to provide a direct drive and a reduced drive, said brake having at least one distortable member which is capable of absorbing a substantial portion of the impulses of the engine.

2. A speed ratio changing device comprising a drive shaft, a driven shaft, gearing connecting the shafts for producing a speed ratio change therebetween, a clutch for controlling the ratio change, said clutch including an operator having a radial component of movement, and means for substantially balancing the centrifugal force in said operator resulting from said radial component.

3. A speed ratio changing device comprising a drive shaft, a driven shaft, gearing connecting the shafts for producing a speed ratio change therebetween, a clutch for controlling the ratio change, said clutch including a rotatable operator having a radial component of movement, and power means for disengaging the clutch by drawing the operator radially inward, said means including a pivoted bell crank having one arm connected to the operator and another arm for transmitting the disengaging power, said last-mentioned arm being weighted to develop a centrifugal force which will substantially balance the centrifugal force developed in the rotatable operator.

4. A speed ratio changing device as in claim 3, said operator comprising a slidable pawl and said clutch having a slotted member with which the pawl is adapted to engage to effect a change in ratio.

5. A speed ratio changing device including a clutch comprising a slotted element, a carrier, a pawl slidably mounted in said carrier and adapted to engage one of the slots in the element to engage the clutch, a pivoted lever for controlling the pawl, said lever having one arm engaging the pawl, a fixed support, a plate reciprocably mounted in said support, a second arm on said lever extending into the path of movement of the plate, a shoe on the extending arm for engaging the plate, and means under the control of the operator for reciprocating the plate, thereby engaging and disengaging the clutch by the action of the lever on the pawl.

6. A speed ratio changing device as in claim 5, said pawl being radially disposed, and said extending arm being weighted substantially to counterbalance the centrifugal force developed in the pawl.

7. A speed ratio changing device as in claim 5, an abutment on the fixed support, and resilient means for urging the plate in one direction, said abutment serving to prevent the plate from rotating.

8. A speed ratio changing device as in claim 5, a piston secured to said plate, a hydraulic cylinder in the support for moving the plate in one direction, and resilient means acting between the support and plate for opposing the movement of the piston.

9. A transmission for an impulse engine having low rotational inertia, said transmission comprising a speed changing mechanism and an automatic brake associated with said mechanism for operating as a reaction means to complete a power train through the transmission, said brake comprising two spaced bearing members and at least one roller therebetween, one of said members having a cam surface to wedge said roller between said members and prevent relative movement in one direction therebetween and another of said members being of such a light construction that it is resiliently distorted by said roller when the brake functions as a reaction means whereby the brake absorbs a substantial portion of the engine impulses.

10. A transmission for an impulse engine having low rotational inertia, said transmission comprising a speed changing mechanism and an automatic brake of the roller and cam type associated with said mechanism for operating as a reaction means for completing a power train through the transmission, said brake being of such a light construction that it is resiliently distorted under the engine impulses and thereby absorbs a substantial portion of the impulses, and a friction brake cooperating with and in parallel relationship with said automatic brake for absorbing the recoil produced by said one-way brake.

11. A transmission for an impulse engine having low rotational inertia, said transmission comprising a speed changing mechanism and an automatic brake associated with said mechanism for operating as a reaction means to complete a power train through the transmission; said brake comprising two spaced bearing members and at least one roller therebetween, one of said members being stationary and the other being rotatable, one of said members having a cam surface to wedge said roller between said members and prevent rotation in one direction of the rotatable member, one of said members being of such a light construction that it is resiliently distorted by said roller when the brake functions as a reaction means whereby the brake absorbs a substantial portion of the engine impulses, and a friction brake on a surface of said rotatable member opposite its roller gripping surface for absorbing the recoil produced in said automatic brake.

12. A speed-changing mechanism for changing the speed ratio between an impulse engine and a bladed propeller to be driven thereby, said mechanism including means for producing a direct drive and means for producing a reduced drive, said second-named means including means effective when the mechanism is conditioned for direct drive for preventing reverse rotation of the propeller, said last-named means including a resilient part whereby when the mechanism is conditioned for reduced drive the last-named means absorbs a substantial portion of the impulses of the engine.

13. A power transmission system comprising in combination, an engine, a transmission connected with said engine, said engine driving said transmission and imposing a series of impulses thereon, said transmission comprising a speed changing mechanism and a brake associated therewith to provide a fulcrum for a speed changing drive through the mechanism, said brake comprising two members and a plurality of rollers for wedging between the members, at least one of said members being resilient to yield under roller pressure resulting from individual engine impulses and thereby absorb a substantial portion of the impulses.

WILLIAM E. MOFFITT.